Dec. 25, 1945.   E. PAGE   2,391,503
APPARATUS FOR FACILITATING THE TRANSPORT OF AIRCRAFT
Filed March 10, 1943    2 Sheets-Sheet 1
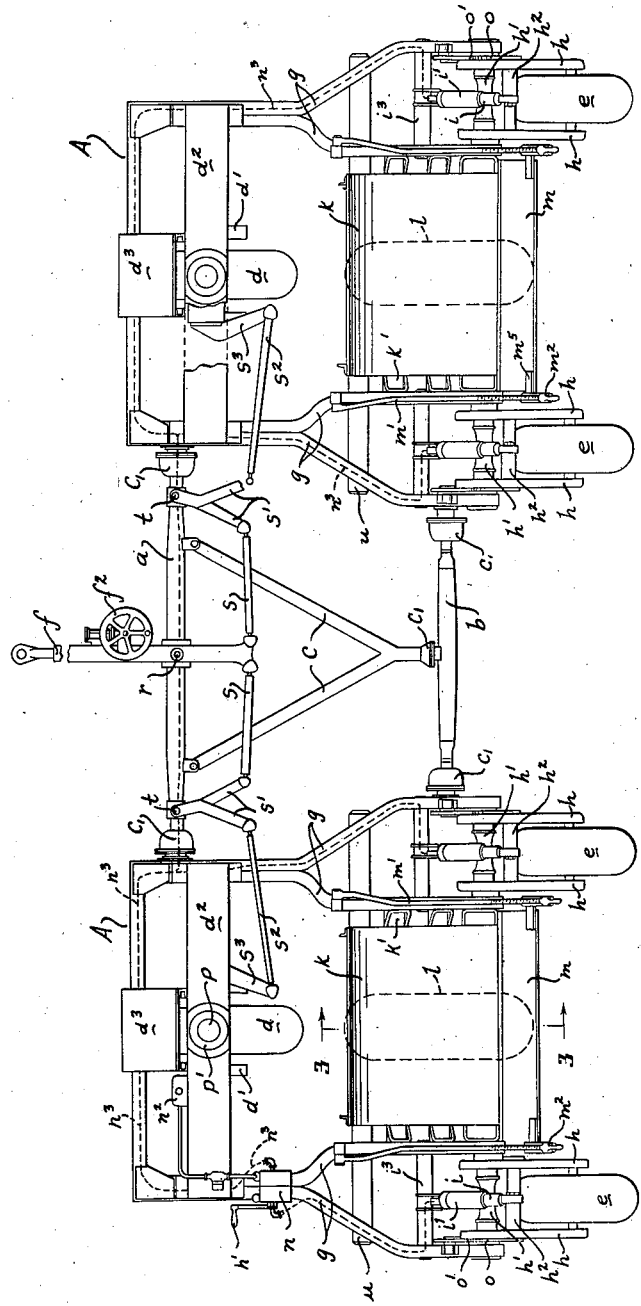
E. Page
INVENTOR.

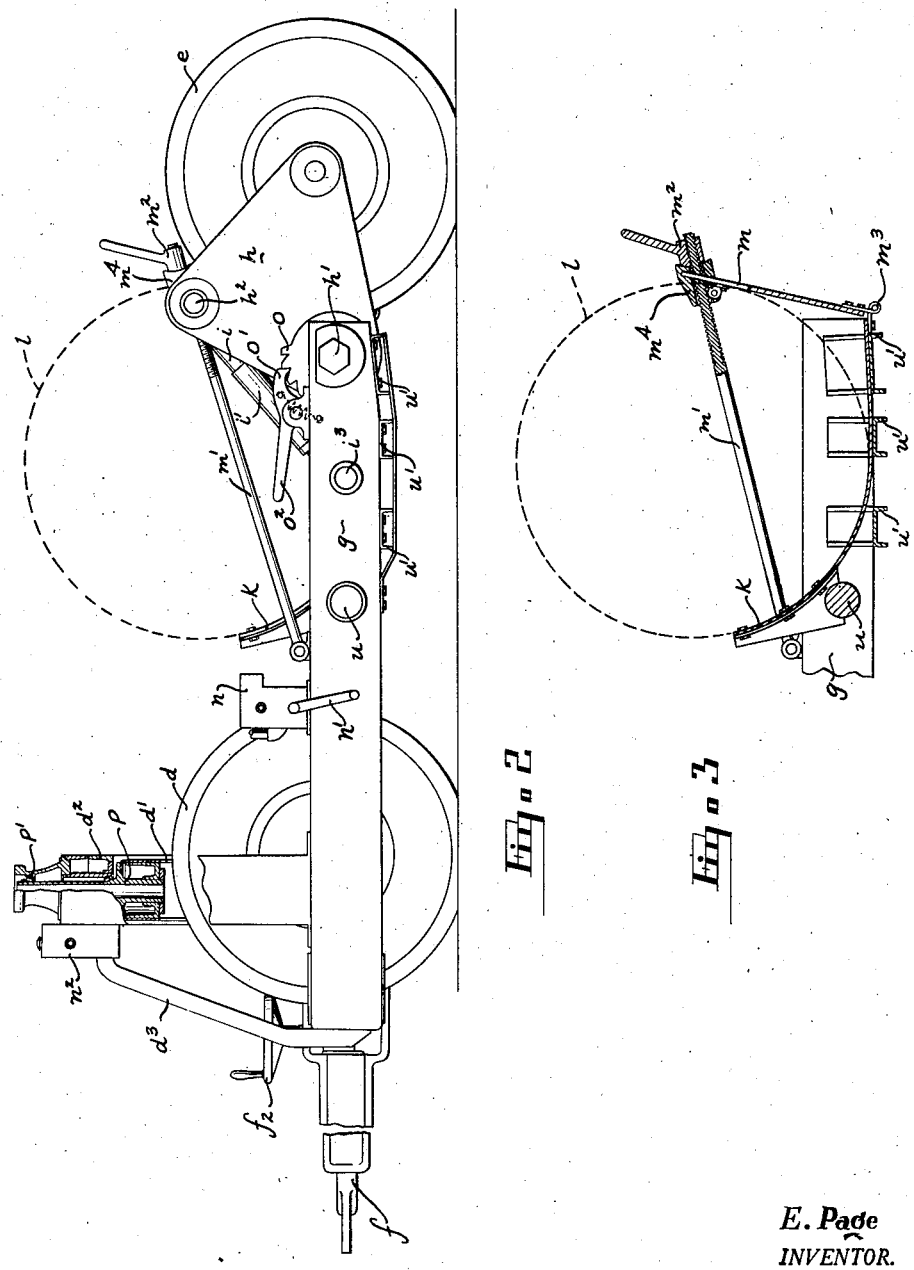

Patented Dec. 25, 1945

2,391,503

UNITED STATES PATENT OFFICE 2,391,503

APPARATUS FOR FACILITATING THE TRANSPORT OF AIRCRAFT

Ernest Page, Upminster, England, assignor to Ford Motor Company, Dearborn, Mich.

Application March 10, 1943, Serial No. 478,626
In Great Britain May 5, 1942

6 Claims. (Cl. 280—33.5)

This invention has for its object to devise a simple and effective means by which aeroplanes of all types and sizes may be readily and rapidly dispersed about an aerodrome, or generally transported from one place to another.

For the satisfactory attainment of this object it is necessary that the heaviest aeroplanes may be easily loaded on to the apparatus employed and that any aeroplane when in transit should suffer no damage when carried over rough or uneven ground and both these essentials are obtained by apparatus in accordance with my invention.

The invention consists in apparatus for the transport of aeroplanes comprising two wheeled or mobile units distanced apart to suit the wheel track of the aeroplane and articulated together in such a manner that they may rise and fall independently of one another as would be required with the vehicle travelling over rough country, the arrangement being such that the aircraft merely tilts from side to side and is relieved of all stresses caused by obstructions on the ground due to the articulated action of the transport device.

The invention also consists in apparatus for the transport of aeroplanes comprising two wheeled or mobile units distanced apart to suit the wheel track of the aeroplane and articulated together in such a manner that they may move angularly relative to one another about both longitudinal and transverse axes.

The invention also consists in apparatus according to either of the two preceding paragraphs in which each unit has a three-wheel support constituted by a single front wheel for steering and a pair of rear wheels.

The invention also consists in apparatus according to the preceding paragraph in which each rear wheel of a unit is carried in a support pivoted to the frame of the unit and between which and the frame is an extensible and retractable link operated hydraulically or otherwise and by the operation of which the rear end of the frame of the unit may be lowered towards or raised from the ground surface.

Further features of the invention will be apparent from the description given hereafter.

The accompanying drawings illustrate one convenient form of apparatus in accordance with the invention, Figure 1 being a plan, and
Figure 2 is a side elevation.
Figure 3 is a partial vertical section showing the decking and ramp construction.

In carrying my invention into effect in one convenient manner I form my improved transport apparatus with two identical frame units, generally designated as A, as clearly seen in Figure 1, and each of which comprises a frame or chassis constructed conveniently of formed steel channels and weldless steel tubing although it will be understood that any other suitable construction may be adopted. The units are connected by an articulated linkage which allows the two to rise and fall independently of one another so that when the apparatus is passing over rough or uneven ground the aircraft carried by the apparatus will merely tilt from side to side and will be relieved of all stresses caused by obstructions on the ground due to the articulated action of the apparatus. In the particular construction illustrated the articulation between the two units consists of two transverse tubes $a$, $b$ connected by V bracing $c$ and at the points of connection of the tubes with the frame units, and at the apex of the V, I provide ball or other suitable universal joints as shown at $c^1$. Modification of the width of this linkage makes the apparatus suitable for aircraft having any width of wheel track and with present aircraft the whole range can be accommodated on three sizes of apparatus, the main differences between which lie in the width of the articulated linkage and in the tire equipment.

Each frame unit A in the construction illustrated is provided with three pneumatic tired wheels of large section, a front wheel $d$ and two rear wheels $e$. The front wheels are mounted in stirrups $d^1$ pivoted by the pivot post $p$ in the bearing $p^1$ on the support bridges $d^2$ strengthened by stays $d^3$ and the front wheel mountings are connected to the towing attachment $f$ (pivoted upon the front articulated cross tube $a$ on the vertical pivot pin $r$) by means of a four-piece steering linkage comprising the center links $s$, the double cranks $s^1$ pivoted at $t$ on the bar $a$, the outer links $s^2$ and the arms $s^3$ attached to the respective front wheel mountings designed to give approximate Ackermann steering. These links and cranks are connected together through ball joints in such a way that there is no interference with the front wheel paths when the frame units rise and fall independently. The steering of the device is effected merely by lateral movement of the towing attachment $f$ which conveniently mounts a hand brake operated by the hand wheel $f^2$, the brake acting upon the rear wheels through conventional linkage not shown in detail.

Each of the rear wheels $e$ is mounted between two triangular side-plates $h$ pivoted upon across tubes $h^1$, mounted between the rearwardly extending forks $g$ of the frame units A. The side plates $h$ are also connected by cross tubes $h^2$ which serve as anchors for hydraulic ram plungers $i$, the cylinders $i^1$ of which are pivotally anchored at their closed ends to the crossbars $i^3$ extending between the forks $g$ of the frame unit A. As will be clearly seen from Figure 2 the connections of the side-plates to the wheels, to the forks $g$ at $h^1$ and to the ram anchor cross tubes $h^2$ are located respectively at the three apices of the plates.

Each frame unit A is provided with a decking $k$ adapted to take one of the aircraft wheels (shown at $l$ in Figure 2) the forward part of the decking being upwardly curved to prevent forward movement of the aircraft and the decking being also conveniently provided with suitable side chocks $k^1$ to prevent lateral movement of the aeroplane wheels. The decking $k$ is supported and the unit structure tied together by a main cross member $u$ extending through both pairs of forks $g$ in each unit and by a number of channel sections $u^1$ (best seen in Figure 2) corresponding in location to the chocks $k^1$ and extending between the inner members of the forks $g$. Each frame unit is also provided with a ramp $m$ hinged to the rear edge of the decking $k$ at $m^3$ to facilitate movement of the aircraft on to the unit and when the aircraft is in position it will be restrained from backward movement by securing the ramps $m$ in their upper position as shown in Figure 2, this being conveniently effected by ramp tie rods $m^1$ and clamping nuts $m^2$. As best seen in Figure 3, the tie rod $m^1$ is pivoted at its forward end to one of the forks $g$. The rear end is threaded and carries a freely slidable block $m^4$, having an extending portion slotted at $m^5$ to fit over the rear edge of the ramp $m$. The rear face of the block $m^4$ and the front face of the nut $m^2$ are spherically formed so the nut may be rotated freely in various angular positions. In operation, the nut $m^2$ is backed off, the ramp $m$ lifted, the slot $m^5$ engaged over its rear edge, and the nut tightened down to draw the ramp tightly against the aircraft wheel $l$.

In operation the ramps are released and their rear edges allowed to rest upon the ground, and fluid is pumped from the hydraulic cylinders $i^1$ so that the link between the rear wheel supports and the frame constituted by the ram and cylinder $ii^1$ is shortened and the side plates $h$ rotated about the pivot at $h^1$ so that the rear ends of the frames approach or even rest upon the ground. In this position the height of the decking above the ground is approximately about 2½" so that the aeroplane may be easily wheeled into position upon the units. When the aeroplane has thus been positioned it is secured in place by securing the ramps in their elevated position and fluid is then pumped into the rams by either hand or power-operated pump $n$ mounted on a frame side member, and by this means the link $ii^1$ is extended so that the frame members are restored to their horizontal positions and the apparatus is now ready for towing as shown in the drawings. A single pump $n$ serves all four hydraulic cylinders $i^1$ through the ducts $n^3$, so that the pressure in each is equalized. The pump $n$ may be operated by the hand crank $n^1$ or by a directly connected auxiliary gasoline engine not shown in the drawings but which, normally, would be mounted on the frame member in proximity to the pump. In that event, the pumping is remotely controlled from the valve $n^2$.

In cases of failure of oil pressure during or after pumping ratchets $o$ and pawls $o^1$ are provided at the pivot points $h^1$ of the side plates in order to prevent damage to aircraft by any sudden collapse of the trailer. The pawl $o^1$ is spring-controlled so that it automatically engages the ratchet and when it is desired to disengage the same, the pawl is freed by operation of the ram and is disengaged by depression of the lever $o^2$.

To unload an aircraft the pawls are disengaged from the ratchets, the pump reversed to withdraw fluid from the rams thus shortening them and lowering the frames to the ground, and the ramp tie bars $m^1$ are disconnected from the ramps which are then lowered and the aircraft wheeled off.

The advantage of the present invention is that it provides a transport unit upon which an aircraft can be readily loaded for transportation and thereafter any stresses incident to haulage, steering or inequalities in the ground surface are taken by the transport rather than the aircraft. The wheel loads of heavy bombers are enormous and the present structure, by dividing this between a number of wheels, permits the movement of the craft over very soft ground. The provision made for lowering the deck of the transport for loading is important when it is considered that the burden to be carried may exceed forty tons. Rather than depend for steering on dragging one set of wheels or the other, integrated control of pivoted steering wheels permits easy turns with a minimum of distorting stress.

It will be understood that the invention is not to be limited to the foregoing details of construction which are given by way of example only as the invention essentially consists in the employment of two separate and laterally articulated units and I may modify the form and construction of such units, the means for articulating the same together, and the arrangements adopted for facilitating the loading and unloading of the aircraft on to and off the units depending upon any practical requirements that may have to be fulfilled. In some cases also I may provide means (such as telescopic connections) for varying the width of the articulation of any one apparatus so that the one apparatus may be made to accommodate aircraft of different wheel track widths.

I claim:

1. In an apparatus for the ground transport of aircraft, a pair of trucks, each comprising, a frame and a plurality of supporting wheels at least one of which is steerable, means on said frame to receive a landing wheel of an aircraft to be transported thereon, said trucks arranged side by side and spaced a distance equivalent to the gage of the landing wheels of said aircraft; articulating means joining said trucks, comprising, a pair of transverse cross members extending between said trucks and universally joined at each of their ends to said trucks and a longitudinal member fixedly secured to one said transverse cross member and having a universal joint connection with the other said transverse cross member, a drawbar pivoted on said one transverse cross member, and a steering linkage operated by said drawbar and connected to said steerable wheels.

2. In a truck for the transport of aircraft and the like, a substantially U-shaped frame, a wheel pivotally mounted on said frame at the base of said U, wheel-supporting arms pivotally mounted on a horizontal axis at the end of each arm of said U, a wheel rotatably mounted on each said wheel-supporting arms spaced from said pivotal mounting, selectively operable means between said frame and said arm to rotate said wheel-supporting arms about said pivotal mounting in a vertical plane, and a platform supported on said frame intermediate said wheel-supporting arms.

3. The structure of claim 2, which is further characterized in that said selectively operable means is a hydraulic cylinder connected between said frame and said wheel-supporting means, the point of mounting of said wheel-supporting means with respect to said frame and the point of mounting of said wheel on said wheel-supporting means, and the point of attachment of said hydraulic cylinder to said wheel-supporting means forming the apices of a triangle, respectively.

4. The structure of claim 2, which is further characterized in that two of said frames and associated mechanism are placed side by side conforming to the gage of the landing wheels of the aircraft to be carried thereon and joined by articulating and steering linkage to operate as a unit.

5. The structure of claim 2, which is further characterized in that two of said frames and associated mechanisms are placed side by side conforming to the gage of the landing wheels of the aircraft to be transported thereon and joined by articulating linkage, a drawbar associated with said articulating linkage, and a steering linkage associated with said drawbar and said pivotally mounted wheel in each frame.

6. In an apparatus for the ground transport of aircraft and the like, a pair of spaced wheeled trucks, each truck including a platform, means selectively operable to lower said platform into proximity with the ground for loading and to lift said platform from the ground for transport, articulating means between said trucks permitting free relative movement between said trucks in the vertical plane, a drawbar, and linkage between said drawbar and said trucks to steer said trucks therefrom.

ERNEST PAGE.